April 30, 1963  I. G. FULTON  3,087,596
DISCHARGE TURRET WITH DOUBLE DIVIDER
Filed Sept. 14, 1961  3 Sheets-Sheet 1

INVENTOR.
Irvin G. Fulton
BY
Bacon & Thomas
ATTORNEYS

April 30, 1963
I. G. FULTON
3,087,596
DISCHARGE TURRET WITH DOUBLE DIVIDER
Filed Sept. 14, 1961
3 Sheets-Sheet 2
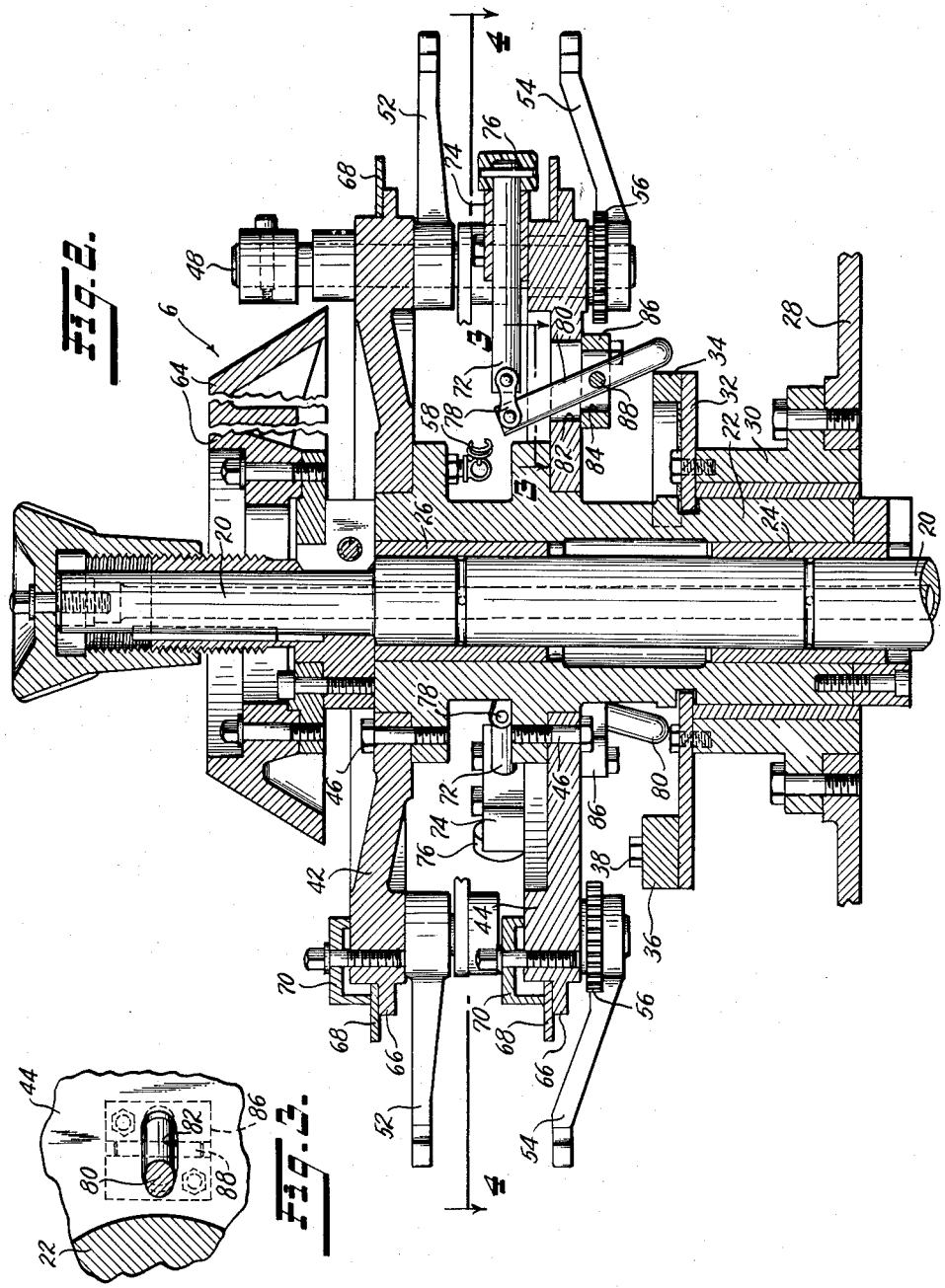
INVENTOR.
Irvin G. Fulton
BY
Bacon & Thomas
ATTORNEYS

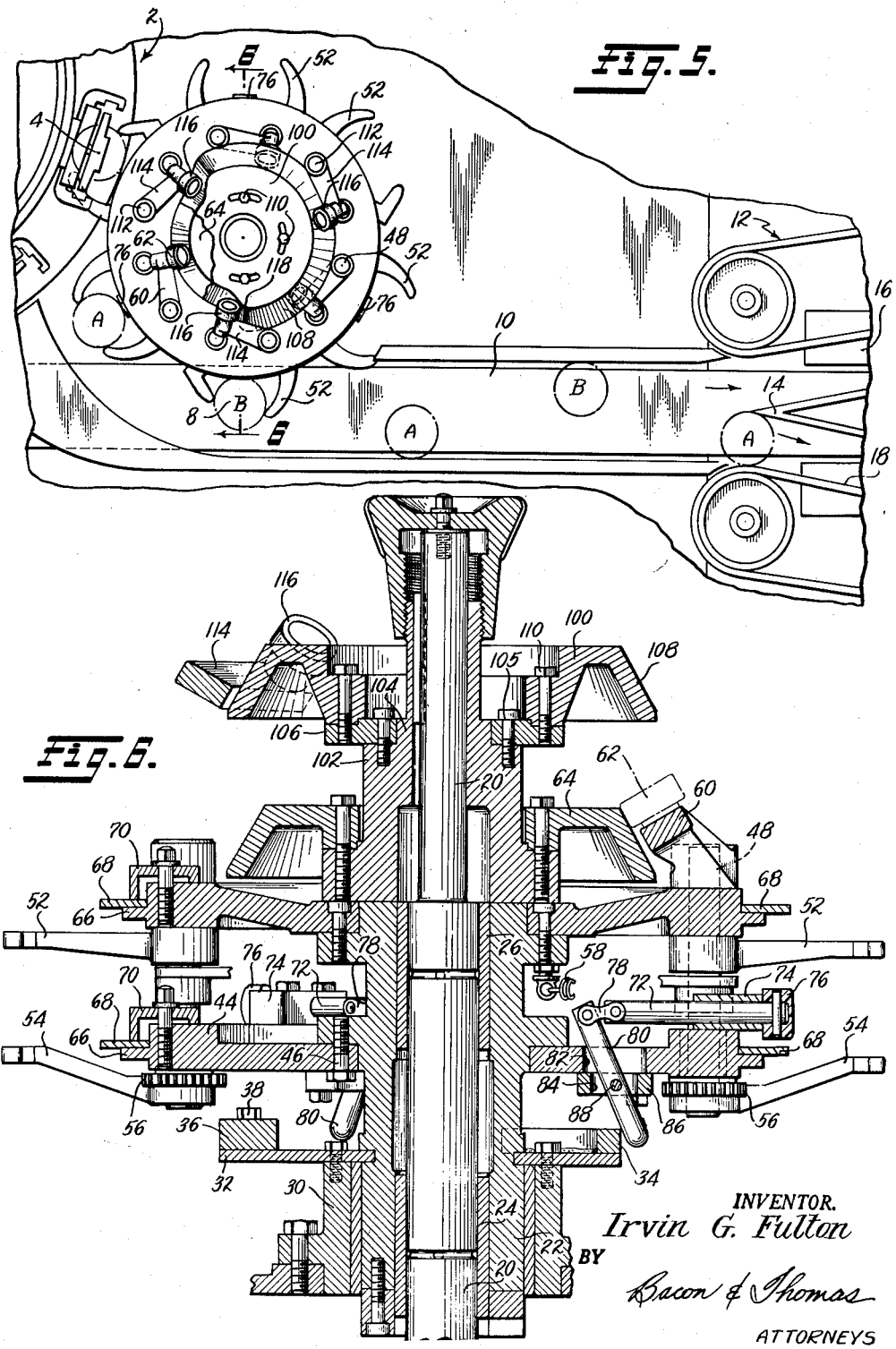

United States Patent Office 3,087,596
Patented Apr. 30, 1963

3,087,596
DISCHARGE TURRET WITH DOUBLE DIVIDER
Irvin G. Fulton, Durham, N.C., assignor to Sperry Rand Corporation, Wilmington, Del., a corporation of Delaware
Filed Sept. 14, 1961, Ser. No. 138,128
5 Claims. (Cl. 198—31)

This invention relates to transfer devices and particularly to turrets for transferring articles from one station to another wherein it is desired to deliver the articles at the second station, alternately, to two different rows.

In the commercial processing of many different types of articles it is often desirable that the articles leaving one step of the process be transferred to the in-feed area of the next step and that they be divided into two different streams or rows to be fed separately to a pair of similar machines or the like. Many reasons exist why such a device is often desirable, and it is an objective of this invention to provide a transfer means to receive a single stream of articles and deliver them to a different position in the form of two separate streams or rows.

In brief, a preferred form of the apparatus comprises a rotary turret having article-gripping jaws around its periphery and cam means to close the jaws on an article at a first station, whereby the articles are carried with the turret then to open the jaws to release the article at a second station. The second station usually overlies a conveyor on which the released articles are deposited. According to the invention, alternate grippers on the transfer turret are provided with a plunger or pusher device that pushes the article radially away from the turret at the point of release. Thus, alternate articles are pushed to the far side of the conveyor whereas intermediate articles are deposited on the conveyor closer to the turret and thus the articles form two laterally spaced rows on the conveyor.

It is therefore an object of this invention to provide a transfer device for transferring articles from a single source at a first station to a second station and for releasing those articles at alternating different positions.

Another object of the invention is to provide a device of the type set forth wherein the articles are released and deposited on a conveyor, forming two spaced rows thereon.

Still another object of the invention is to provide a transfer device as set forth but embodied in a rotary turret.

A further object is to provide a transfer device adapted to displace alternate articles for release at different positions.

An additional object is to provide a transfer device of the type set forth that is economical and simple to produce yet highly efficient and dependable in operation.

More objects and advantages will become apparent to those skilled in the art as the description proceeds with reference to the accompanying drawings wherein:

FIG. 2 is an enlarged vertical sectional view taken along the line 2—2 of FIG. 1.

FIG. 3 is a fragmentary sectional view taken along the line 3—3 of FIG. 2.

FIG. 5 is a plan view similar to FIG. 1 but showing a modified form of the invention, and FIG. 6 is a vertical sectional view, similar to FIG. 2 but taken along the line 6—6 of FIG. 5.

Figure 1:
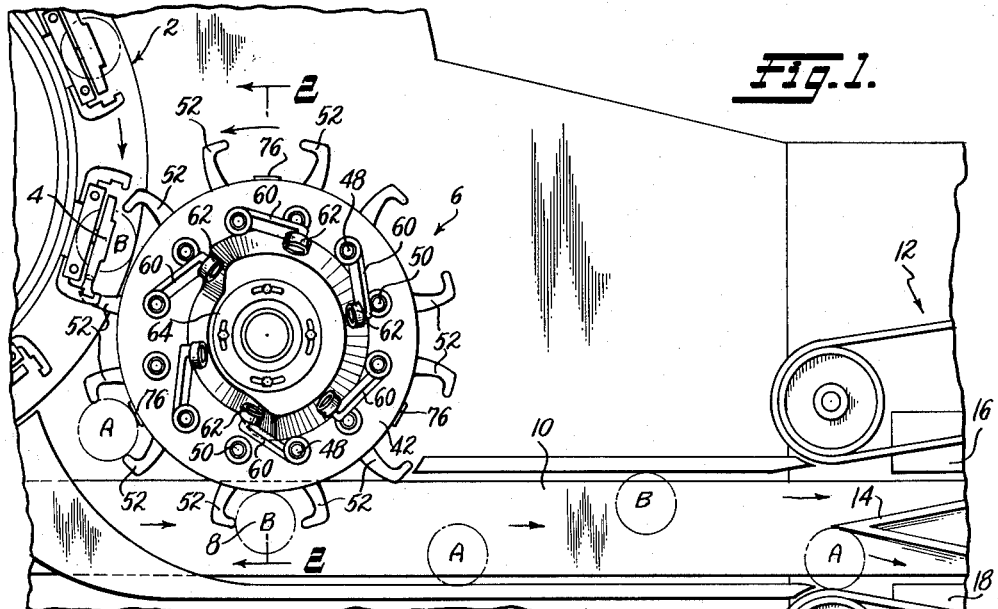
FIG. 1 is a top plan view of a preferred form of device embodying the present invention.

Referring first to FIG. 1, numeral 2 indicates generally a processing machine such, for example as a rotary machine for applying revenue stamps to the necks of bottles. The rotary machine 2 is so operated and timed that it releases a bottle or the like at the point 4, which may be termed a first station. The transfer device of the present invention is embodied, in the specific example illustrated, in a rotary turret device 6 which grips the articles received at first station 4, rotates in a counterclockwise direction, and carries the articles to a second station 8 for release. A conveyor 10 travels adjacent the transfer turret 6, generally tangential thereto and delivers the transferred articles to a further processing machine, indicated generally at 12. The transfer turret 6 is so constructed and operated that it delivers the articles to the conveyor 10 in two laterally spaced rows of articles indicated by dotted lines in FIG. 1. The processing machine 12 may include a pointed separator member 14 overlying the conveyor 10 so that the two rows of articles engage the member 14 on alternately opposite sides of the point thereof and the articles are thereby directed alternately into separate channels 16 and 18. The structure of the transfer turret 6 is more clearly shown in FIGS. 2 and 4 wherein 20 is an upstanding fixed shaft on which a hub 22 is journaled for rotation by suitable bushings 24 and 26. The shaft 20 is mounted on the machine frame which includes a fortion 28 having a tubular member or sleeve 30 surrounding the lower part of the rotary hub 22. The hub 22 is driven in rotation by any suitable means (not shown) in desired timed relation to the processing machine 2 and conveyor 10.

At its upper end the tubular sleeve 30 fixedly supports a cam plate 32 having a crescent shaped re-set cam 34 fixed thereon. A second cam 36 is mounted on the plate 32 for adjustment thereon, by means of bolts 38 extending through slots 40 in the cam member 36.

The upper portion of the rotary hub 22 supports vertically spaced turret plates 42 and 44. These plates are rigidly fixed to the hub 22 by bolts 46 or the like.

A plurality of pairs of rock shafts 48 and 50 extend vertically through and are journaled in the turret plates 42 and 44 and are arranged parallel to each other. Each shaft of each pair is provided with a pair of outwardly extending gripper jaws 52 and 54 in vertical alignment with each other. The jaws 54 include portions constituting interengaging gear sectors 56 (see particularly FIG. 4) rigidly fixed thereto, so as to enforce the shafts of each pair, and their gripping jaws 52, to rock in opposite directions to either open or close the jaws. A spring 58 is anchored at one end to an eccentric member on one of the shafts 48 or 50 of each pair and at its other end to an anchor on the hub 22. The springs 58 thus function to turn the shafts 48 and 50 in a direction to bring their jaws 52 and 54 toward each other or in a closing direction. Above the uppermost turret plate 42 one of the shafts of each pair is provided with an arm 60 (see FIG. 1) fixed thereto and having a cam following roller 62 rotatably mounted at its outer end. The rollers 62 are thus spring-urged into engagement with the tapered surface of a conical cam 64 mounted on the upper end of central shaft 20. The conical cam 64 is mounted for vertical adjustment on the shaft 20 for the purpose of adjusting or changing the range of movement of the cam followers 62 to thus adjust the device for articles of different diameters. The cam 64 is so configured that each pair of jaws 52 and 54 is actuated to closed position at first station 4 and then actuated to open position at second station 8 whereby to grip articles released by machine 2 at station 4, carry them in a counter-clockwise direction (FIG. 1) to station 8 whereupon the jaws 52 and 54 open and release the articles to the conveyor 10.

The gripper jaws 52 and 54 and their actuating mechanisms, including the adjustable conical cam 64, are similar to, and may be identical to, corresponding portions of the transfer turret described in the patent to Couch et al., No. 2,984,337. The vertical adjustment of the conical cam 64 is fully described in the patent referred to. A further embodiment, to be described, may also employ the double cam feature shown in said patent.

Each of the turret plates 42 and 44 is provided with an outer circumferential rib or shoulder 66 on which an outer ring 68 is positioned and releasably held by suitable clamps 70. When the turret is adjusted for articles of different sizes, rings 68 of different widths are mounted on the turret to define stop means against which the articles rest during movement by the transfer turret.

Figure 4:
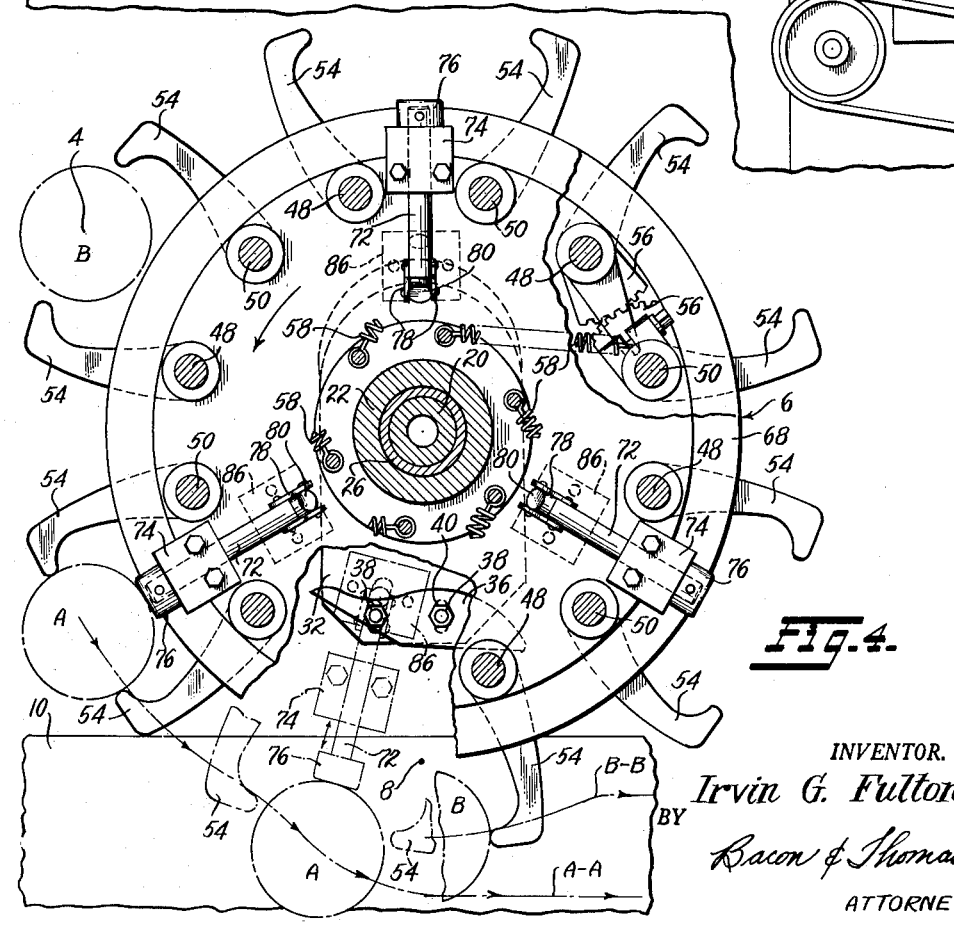
FIG. 4 is a horizontal sectional view taken along the line 4—4 of FIG. 2 and showing certain parts in different positions, by dotted line.

As seen in FIGS. 1, 2 and 4 alternate pairs of gripper jaws 52 are provided with an associated pusher member 72. Each pusher member 72 is in the form of a slide rod, slidably mounted in a guiding block 74 fixed to the upper surface of lower turret plate 44. Each pusher member 72 is provided at its outer end with a head 76 preferably of relatively soft material to avoid injury to or breakage of glass containers. At its inner end each pusher member 72 is connected by links 78 to the upper end of a lever 80 which extends downwardly through a slot 82 in turret plate 44. The levers 80 also extend through an aligned slot 84 in a block 86 fixed to the underside of turret plate 44. The levers 80 are pivoted intermediate their ends on pins 88 whereby they are pivoted on an axis tangential to the blocks 86. The lowermost ends of the lever 80 are in position to engage the cams 34 and 36 previously mentioned.

By reference to FIG. 4 it will be seen that the pusher members 72 are in their innermost positions as they move from the first station to the second station and at about the time they reach the second station 8 the lower end of a lever 80 engages the inner cam face of cam 36 to thus swing the lever 80 and slide the pusher member 72 outwardly of the turret in a radial direction and at about the same time that the associated pair of gripper jaws 52 is being opened by cam 64. Thus, the article B gripped by that pair of jaws is released by those jaws and simultaneously pushed by the pusher 72 in a direction radially away from the turret 6.

In FIGS. 1 and 4 the articles gripped by gripper jaws associated with pusher members 72 are identified as articles A whereas the intermediate articles are identified as articles B. As will be apparent from the description thus far and particularly with reference to FIGS. 1 and 4, the articles B are merely released by the jaws at the second station whereupon the conveyor 10 takes them away along a path passing through their point of release. Actually even after the jaws 52 are opened the jaw will engage the article B and push it a slight distance toward the inner edge of conveyor 10 along a path somewhat like that indicated at B—B in FIG. 4. It will be noted that the articles B are ultimately carried by conveyor 10 at the inner or rear side thereof. On the other hand, articles A which are gripped by jaw 52 associated with pusher members 72 are not merely released at station 2 in the same manner as articles B but are simultaneously pushed radially outwardly away from the center of turret 6 and followed a path substantially like that indicated by the dotted arrow A—A at the bottom of FIG. 4 so that the articles A form a row at the outer or front edge of conveyor 10.

The cam surface of cams 64 and 36 are so configured and related that the jaws 52 are opened fairly gradually at second station 8 and so that pusher member 72 moves outwardly during the opening movement of the jaws 52 but at a rate insufficient to jam or wedge the articles A between the opening gripper jaws.

After release of articles at station 8, the pushers 72 remain in their outer positions as the turret 6 continues to rotate. The inner edges of levers 80 engage the outer surface of crescent-shaped re-set cam 34 and are swung thereby in a direction to retract pushers 72 to their inner positions, as shown at the top of FIG. 4. The pushers 72 then remain in their inner positions until actuated again by cam 36 in the manner previously described.

Referring now to FIGS. 5 and 6, the modification shown therein is very similar to that of FIGS. 1 through 5 and parts bearing like reference numerals are considered to be identical to those already described. By reference to FIG. 6 it will be noted that the lower part of the structure, up to and including the cam 64, is substantially identical to corresponding parts of the first embodiment and operate in the same way. In this embodiment, however, the gripper jaws 52 and 54, with which the pusher members 72 are associated, are the only ones actuated by cam 64. The intermediate pairs of gripper jaws, those engageable with articles B, are actuated by an upper cam 100. The cam 64 is mounted on a hub element 102, keyed to the shaft 20 and having an upper hub portion 104 extending upwardly above the cam 64. A plate 106 is fixed to the cam portion 104 by bolts 105 and the upper cam 100 is secured to the plate 106 by bolts 110. The means for adjusting the two cams 64 and 100 in a vertical direction and angularly about shaft 20 are the same as those shown in FIG. 2 and fully described in the earlier patent previously referred to.

The upper cam 100 and its conical camming portion 108 is configured generally the same as lower cam 64 but with slight differences, to be described hereafter.

Those pairs of gripper jaws 52 and 54 which are intermediate those jaws associated with pushers 72, are mounted on vertical shafts similar to those already described in connection with the first embodiment. In this case, one of the shafts, 112, is of greater vertical length than the others and is provided with a radial arm 114, at a level corresponding to the level of the upper camming portion 108. A cam follower roller 116 is journalled on the outer end of the arm 114 and engages the camming portion 108. Both cams 100 and 64 are configured to cause the jaws operated thereby to close on an article at first station 4, previously described. The lower cam 64 is configured to open the jaws 52 and 54 associated therewith rather gradually at discharge station 8 so as to open only fast enough to permit the pusher 72 to push the articles A to the outer side of conveyor 10 and without completely releasing those articles until they are so located. On the other hand, the riser 118 (see FIG. 5) of camming portion 108 is angularly displaced from the corresponding riser of the lower cam 64 so that the articles B in the gripper jaws controlled thereby are not released exactly at station 8 but are carried therepast until they reach the inner edge of conveyor 10. At that time the rollers 116 ride up the rather abrupt riser 118 to release the articles B at the inner edge of conveyor 10. In many instances, the embodiment shown in FIGS. 5 and 6 is a preferred form of the invention since it permits individual angular adjustment of the cams 64 and 100 to more accurately control the position of release of the articles and to adjust the position of release of either articles A or B without affecting the point of release of the other.

While a limited number of specific embodiments of the invention are shown and described herein, it is to be understood that the same are merely illustrative of the invention and that other forms of the device embodying this invention may be constructed within the scope of the appended claims.

I claim:

1. In a device of the type described; a plurality of article gripping means serially moveable along a predetermined closed path; means for closing said gripping means to grip articles at a first station and for opening said gripping means to release said articles at a second station; a linear conveyor at said second station extending tangentially of said path; pusher means moveable along said path adjacent alternate gripping means and arranged to engage an article therein to push the same laterally of said path; and means at said second station for actuating said pusher means whereby articles released at said second station are alternately released at different distances laterally of said path and at different lateral positions on said conveyor.

2. A device as defined in claim 1 wherein said gripping means are mounted at the periphery of a rotary turret and wherein said pusher means are mounted on said turret for radial movement thereon.

3. In a device of the type described, a rotary turret; a plurality of pairs of gripper jaws mounted on said turret for relative movement toward and from each other and extending generally radially outwardly therefrom; actuating means, including a stationary cam adjacent the center of said turret, for closing each pair of said jaws at a first station to grip an article therebetween and to open said jaws at a second station to release a gripped article therefrom; a linear conveyor at said second station extending tangentially of said path; radially moveable pushers mounted on said turret between alternate pairs of said jaws; and stationary cam means for moving said pushers radially outwardly of said turret at said second station to push alternate released articles radially away from said turret at said second station whereby to form two laterally spaced rows of articles on said conveyor.

4. A device as defined in claim 1 including a first stationary cam for actuating said alternate gripping means; a second stationary cam for actuating the intermediate gripping means between said alternate gripping means; said first and second cams being configured to open their respective gripping means at different positions in said second station.

5. A device as defined in claim 4 wherein said cams are so configured that said alternate gripping means are opened more gradually than said intermediate gripping means.

References Cited in the file of this patent
UNITED STATES PATENTS

| | | |
|---|---|---|
| 1,180,984 | Day | Apr. 25, 1916 |
| 1,326,903 | Augensen | Jan. 6, 1920 |
| 2,827,998 | Breeback | Mar. 25, 1958 |
| 2,984,337 | Couch | May 16, 1961 |